United States Patent [19]

Suzuki

[11] 4,206,632
[45] Jun. 10, 1980

[54] LIQUID DETECTING DEVICE

[76] Inventor: Hirosuke Suzuki, 16-7, Kitaminemachi, Ohta-ku, Tokyo, 105, Japan

[21] Appl. No.: 5,712

[22] Filed: Jan. 23, 1979

[51] Int. Cl.$^2$ .............. G01M 3/16; G01R 31/08; H01B 7/32
[52] U.S. Cl. .................. 73/40.5 R; 174/115; 324/52
[58] Field of Search ............. 73/40.5 R; 174/11 R, 174/115; 324/52; 340/605; 200/61.04

[56] References Cited

U.S. PATENT DOCUMENTS

| | | | |
|---|---|---|---|
| 3,564,526 | 2/1971 | Butts | 200/61.04 X |
| 3,600,674 | 8/1971 | Brea et al. | 324/52 |
| 3,721,898 | 3/1973 | Dragoumis et al. | 340/605 X |
| 3,981,181 | 9/1976 | Ochiai | 73/40.5 R |
| 4,029,889 | 6/1977 | Mizuochi | 174/11 R |
| 4,095,174 | 6/1978 | Ishido | 174/11 R X |

FOREIGN PATENT DOCUMENTS

| | | | |
|---|---|---|---|
| 978614 | 11/1975 | Canada. | |
| 46-7902 | 2/1971 | Japan | 200/61.04 |

Primary Examiner—Gerald Goldberg
Assistant Examiner—Joseph W. Roskos
Attorney, Agent, or Firm—Mortenson & Uebler

[57] ABSTRACT

A liquid leak detecting device is provided comprising at least two electrical conductors arranged in parallel and separated from each other by a material comprised of continuously porous polytetrafluoroethylene containing an electroconductive material within its pores.

7 Claims, 3 Drawing Figures

LIQUID DETECTING DEVICE

BACKGROUND OF THE INVENTION

Liquid leaks from a petroleum pipeline, petroleum tanks and the like can become a cause of various accidents, for example environmental pollution, fire or explosion. Therefore, it is established by law in certain countries that equipment be installed for detecting liquid leaks from petroleum pipelines and tanks. Also, it is desirable to install such leak detecting equipment on gas holding tanks, storage tanks and pipings used in chemical plants which contain dangerous liquids such as fuels, solvents or poisonous liquids.

In order to detect liquid leaks, many proposals have previously been made. Of the conventional means, those utilizing light and electricity are listed below:

1. Light Attenuation Method. Attenuation of light, caused by the intrusion of liquid leak into a detecting device (fiber-optic cable), is measured to detect a leak.
2. TDR Method. Capacitance change of a leak detecting cable consisting of two parallel conductors separated by a porous insulation, caused by the impregnation of the liquid to be detected, is measured by a TDR to indicate liquid leaks. (U.S. Pat. No. 3,981,181).
3. Short Circuit Method. A short circuit occurring in a cable consisting of two conductors separated by a soluble material when the soluble material is dissolved by the liquid leak, sounds an alarm. (Canadian Patent No. 775,758).
4. Float Method. A float having two electrodes is put on the surface of water. The electrical resistance between the electrodes is increased to indicate an oil leak when oil spreads on the surface of the water.

The method mentioned above, depending upon the application, have certain advantages and in other applications certain disadvantages. For example, Method 1 and 2 above are likely to be affected by moisture or steam. Method 3 above is less reliable and may cause a danger of sparking. Method 4 is easily affected by the movement of the water surface, and adjustments of the electrodes are delicate and unstable.

U.S. Pat. No. 3,412,358 provides an electrical resistance material, used for example as a heating element when voltage is applied, comprising (1) at least one resistive substance such as carbon black, (2) an insulating material such as oils, and (3) a nonconductive carrier such as polyethylene. These materials are mixed together and extruded into foils, plates or the like, and when voltage is applied across the foil, heat is generated. There is no suggestion in this reference of use of this material in leak detection nor that the conductivity of this material will change when in contact with different liquids. There is no suggestion in this reference of using porous PTFE. The polymeric materials cited in the reference all appear to be conventional, melt extrudable, polymers which would produce nonporous, filled articles upon extrusion.

U.S. Pat. No. 3,981,181 shows porous PTFE used in a leak detecting probe. Therein, PTFE insulated wires are laid along a pipe, for example, and an electrical pulse is sent down the wires. The characteristic impedance of that cable is monitored and, when a leak occurs, its location is detected by a measured change in this characteristic impedance. This reference contains no conductive filler nor any suggestion to provide such as conductive filler.

U.S. Pat. No. 3,979,667 discloses an indicator used to measure the moisture content of soil. This reference shows liquid detecting probe means. The probe of this reference contains none of the key elements of the instant invention nor any suggestion of them.

SUMMARY OF THE INVENTION

A device for detecting liquid leaks from storage tanks and other holding means for liquids is provided, the device being connected electrically to resistance measuring means and display means for quantitatively measuring the resistance so measured, the device being at least two electrical conductors held in substantially parallel relationship and separated from each other by a continuously porous PTFE material having an electroconductive substance impregnated within the pores of the porous PTFE material. Preferably the impregnated PTFE material used to separate the conductors is obtained by extrusion and rolling of a mixture of PTFE fine powder, an electro-conductive material such as carbon powder and a liquid lubricant, followed by removal of the lubricant, and subsequent stretching of the lubricant-free material, and partially sintering the PTFE in the impregnated material so obtained.

BRIEF DESCRIPTION OF THE DRAWINGS

In the drawings, various embodiments of the leak detecting device of the present invention are shown.

DETAILED DESCRIPTION OF THE INVENTION

Figure 1:
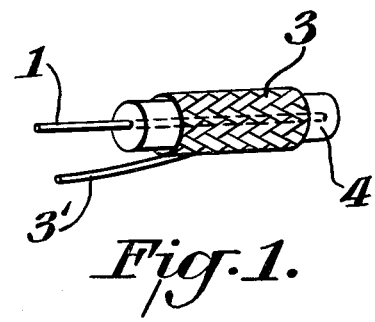
FIG. 1 shows a form of a leak detecting coaxial cable.

The present invention concerns a liquid detecting device comprising at least two parallel conductors separated from each other by continuously porous PTFE containing an electro-conductive material within the pores of the porous PTFE.

The preferred method for making the electroconductive material suitable for use in the device of this invention follows. This method is disclosed in Japanese Patent Publication Sho 52-34653, published on Sept. 5, 1977.

375 g of carbon black (e.g. MA-600 carbon black, product of Mitsubishi Chemical Industries, Ltd., Japan) were placed into a 12 liter dispersing container, and to this was added 5 liters of deionized water. This mixture was stirred thoroughly for 30 minutes to disperse the carbon black in the water.

In a separate container, 2,125 grams of PTFE dispersion powder (e.g. T-41J PTFE dispersion, product of Mitsui Fluoro Chem. Co., Ltd., Japan) was sieved using known techniques into deionized water in an amount such that the PTFE concentration is 15 weight % in the water, reserving one liter of waer for rinsing, and the mixture was stirred to disperse the PTFE thoroughly.

The previously made carbon black dispersion is then added to the PTFE dispersion and the one liter of reserved water is used to rinse the dispersing container, and the rinse is added to the PTFE-carbon black dispersion.

This mixture is thoroughly mixed until gel formation begins at which time 469 grams of Freon 113 fluorocarbon (product of Mitsui) are added and coagulation begins. Upon completion of coagulation, the mixture is poured onto a 200 mesh sieve (having a 76 micrometer opening), to drain away as much of the water as possible.

The coagulated PTFE carbon black material is then dried for 40 hours at 170° C., and sieved with a 6 mesh sieve (having a 3,360 micrometer opening).

The carbon filled PTFE powder so produced can then be paste extruded using conventional methods for making shaped articles of filled PTFE. For example, a 0.004 inch (0.010 cm) thick tape produced by paste extruding this material had a volume resistivity of 80 ohm-cm and a surface resistance of a 8 kiloohms per square centimeter.

This electro-conductive tape is especially suited as the electro-conductive material in the device of this invention. The product tape is available commercially from Mitsui Fluoro Chem. Co. Ltd., Japan, under product designation FC-3-J.

This unsintered, shaped PTFE article (tape) may then be heated for stabilization at a temperature between about 300° and 360° C. The melting point of PTFE is in the range of 327° C.-343° C. It is desirable that the heating for stabilization be carried out for a time period such that the article is partially but not completely sintered. Also, the unsintered, shaped PTFE article (containing no lubricant) may be stretched at least in one direction to 1-15 fold its original length, in accordance with the methods described, for example in U.S. Pat. No. 3,664,915 (disclaimed) and U.S. Pat. No. 3,953,566, which disclose known techniques for making expanded PTFE. The specific gravity of the starting material is decreased and the porosity increased by such stretching. The stretched PTFE material may be heated to a temperature between about 300° and 360° C., i.e., around the melting point of the PTFE, so that the stretched product is stabilized dimensionally.

The electro-conductive substance to be added to PTFE fine powder to produce the covering material of the device of this invention may include electro-conductive powders such as graphite, carbon black, fibrous carbon, powdered metals (e.g. Pt, Au, Ag, Ti, Ta), cermets (e.g. TiC-Co), nitrides (e.g. TiN, BN), borides (e.g. $TiB_2$, $ZrB_2$), silicides (e.g. molybdenum silicide), metal oxides (e.g. $Cu_2O$, TiO, VO, MnO, CoO, NiO, ZnO, CaO, the oxygen content being varied to provide a suitable electro-conductivity) and semiconductive metals or organic substances. In addition to the electro-conductive material, pigments and rubbers such as fluororubber may also be added for the purposes of coloring and reinforcement, respectively.

The electro-conductive substance to be added to PTFE fine powder is used in an amount such that the PTFE mixture has a desired electro-conductivity and sufficient plasticity so as to enable extrusion, rolling or stretching of the filled material. The amount of the conductive substance ranges from 5 to 70 weight %, preferably from 10 to 50 weight %, based on the total weight of the mixture.

The conductors in the device of this invention, at least two in number, are in parallel relationship and are separated by the above electro-conductive material and can be made from any metal having a high electro-conductivity. Examples thereof include copper, silver, gold, iron, aluminum, an alloy of the above or any combination (e.g. cladding, plating) of the above which can be formed in the shape of a line or sheet conductor.

Figure 2:
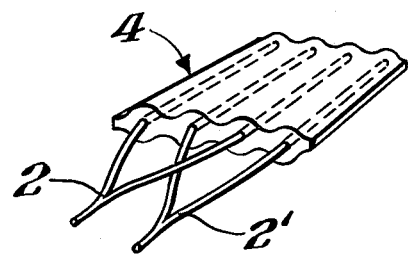
FIG. 2 shows a form of a leak detecting flat cable possessing a plurality of conductors.

The conductors, at least two in number, are separated by the electro-conductive material described above. In principle, the conductors can be separated in any fashion by the material, but in practice they are preferably separated in the following manner. Referring to FIG. 1, one conductor is placed as a center conductor 1 and the other conductor is placed as an outer shielding conductor 3 by braiding, the conductors being separated from each other by the electro-conductive material 4, resulting in a coaxial cable structure. Lead wire 3' and conductor 1 are connected to means for measuring resistivity of the cable. As shown in FIG. 2, many conductors 2, 2' may be embedded in the conductive material 4 in a separated, parallel relationship as in the case of a flat cable. Alternately, in FIG. 3, conductor 1 is covered with the conductive material 4 and further with jacket 5 in a desired configuration, and the other conductor 1' is placed in a separate remote location, both being embedded in the ground 6, where leaks are to be detected. In all of the embodiments, the conductors are connected to a conventional resistance measuring device, such as 7 in FIG. 3, to monitor the electrical resistance between them.

In addition to the above structures, the liquid detecting device of the present invention may be supplied as a parallel or twisted pair cable consisting of two wires insulated with the filled PTFE material, the cable having a jacket with a stripped portion(s) in a desired place(s), or two electrodes with the conductive material located between conductors, or any combination of such structures.

At least two conductors, held in a separate, parallel relationship, may be sandwiched between two conductive, filled PTFE sheets 4 or between a filled sheet and an unsintered, unfilled PTFE sheet (stretched or unstretched) or the foregoing assembly may be used with narrow PTFE tapes covering only the conductors and not covering between conductor areas, this assembly being compressed together into one body. The PTFE covering the areas adjacent the conductors can be heated from outside or inside to a temperature over 327° C., thus sintering the PTFE. This heating above 327° C. from inside is accomplished by applying electric current to the desired conductors, thereby generating Joule heat. By sintering the PTFE material surrounding the conductors, the adhesion between the PTFE and conductors is increased, so that the contact resistance between these materials is reduced. Thus the sensitivity and mechanical strength of the device are increased.

The conductors of the device of this invention which are brought into contact with or covered with the conductive PTFE material may further be covered by sandwiching or enveloping them with an unsintered or partially sintered PTFE sheet, stretched or unstretched, which allows gases or liquids to be detected to pass through, but does not allow liquids having high surface tension (e.g. water) to pass through, followed by sintering of desired portions as described above.

The liquids to be detected by the device of the present invention include, for example, liquid hydrocarbons such as kerosene and gasoline, organic solvents such as carbontetrachloride and methylethylketone (MEK), vapors from liquids having high vapor pressure (e.g. MEK, gasoline, ammonia).

In use, the liquid leak detecting device of the present invention can be installed continuously or intermittently in places with desired spaces along or under holding means or pipelines of the liquids or vapors mentioned above. When liquid or vapor leaks from the holding means or pipings, the leaking liquid or vapor comes in contact with and enters into the continuously porous filled PTFE containing the electro-conductive material, and the electro-conductivity of the covering material is greatly reduced (or the electrical resistance of the material is remarkably increased). This increase of resistance can be detected by a sensor connected through a lead wire to the leak detecting device, thus indicating the occurrence of the leak.

The liquid leak detecting device of the present invention may also be fitted onto a float with the portion between the electrodes of the device being positioned on the surface of water. When an oil film resulting from an oil leak spreads on the surface of the water, the oil is absorbed in the conductive material of the device, thus changing the resistance of the device, enabling the oil leak on the surface to be detected.

Methods of detection included within the scope of the present invention include direct measurement of electrical resistance, a comparison method using a standard resistance, a bridge method, measurement of reflection from an impedance irregular point (TDR method) and like methods. A plurality of the devices of this invention can be connected in series or parallel. Parallel connection is suitable for the TDR detecting method. Measurements using the device in a viscous liquid (e.g. heavy oil) can be facilitated by applying a high voltage to the device, the device being self-heated due to the Joule effect thus lowering the viscosity of the oil around the device.

Figure 3:
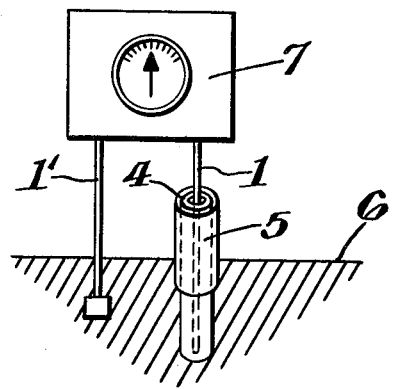
FIG. 3 shows a form of leak detecting device covered with conductive material and jacket material, together with a second, separate conductor, installed in the surface of the ground.

In the embodiment shown in FIG. 3, insulated conductor 1 and bare conductor 1' are placed with a specified distance therebetween in a location where the liquid to be detected enters, such as the ground 6 near a holding tank.

The resistance change of the device of this invention due to the intrusion of the liquid to be detected is more than 50% of the initial resistance. This resistance change is not caused by the resistance change on the surface, but by the volumetric change of resistance of the porous material, so that the leak detector is intrinsically stable for severe environmental conditions, high temperature, humidity, etc. Moreover, since the liquid detecting device of the present invention is made mainly of PTFE which is inherently repellent to water, it is little affected by water and moisture, as well as having excellent heat and weather resistance.

The present invention is further explained by the following examples which are presented for illustration and are not intended to limit the scope of the invention in any way.

EXAMPLE 1

A mixture of PTFE containing 15 weight % of graphite and about 20 weight % of liquid lubricant was preformed, extruded and rolled into a tape of 0.1 mm in thickness using conventional techniques. The tape, 4 mm wide, was wrapped around a 1.5 mm O.D. copper conductor, to an O.D. of 3 mm. The resultant core was then covered with a braiding of thin copper wires, 0.1 mm in O.D. to give a coaxial cable assembly. This assembly was then cut to a length of 3 cm, and connected with a lead wire for each of the inner and outer conductor to provide the leak detecting device shown in FIG. 1. One half of this device was then placed in a constant temperature chamber set at a temperature of 350° C. for one minute to partially sinter the PTFE, thus increasing the contact strength between the conductor and PTFE and the dimensional stability of the device. The second half of the device was not heated.

These leak detecting devices were immersed in MEK, gasoline, kerosene and heavy oil C, and at the same time the resistance change of the devices was measured. The results, in kiloohms, are shown in the tables below. At the time of measurements, the temperature of the liquids and devices was 20° C. and the relative humidity of the ambient air was 56%. The devices used in this experiment were reusable after the impregnated liquid was evaporated. There was a certain relationship between the extent of evaporation and conductivity of the devices during these experiments so that these devices could provide an ability to differentiate between the kinds of liquid detected depending on the difference in their volatility.

| Resistance Change of the Device having Unsintered PTFE in the Covering | | | | | | | | |
|---|---|---|---|---|---|---|---|---|
| Time Liquid | Initial | 5 sec | 10 sec | 1 min | 1 hr | 5 hrs | 24 hrs | 5 days |
| MEK | .701 | 4.2 | 5.0 | 5.0 | 5.0 | 5.0 | 5.0 | 5.0 |
| Gasoline | .750 | 4.1 | 5.5 | 5.5 | 5.5 | 5.5 | 5.5 | 5.5 |
| Kerosene | .800 | 4.0 | 6.0 | 7.3 | 7.3 | 7.3 | 7.3 | 7.3 |
| Heavy Oil C | .310 | .320 | .320 | .330 | .340 | .400 | .560 | 1.9 |
| Water | .440 | .440 | .440 | .440 | .475 | .500 | .540 | .600 |

| Resistance Change of the Device having Partially Sintered PTFE in the Covering | | | | | | | | | |
|---|---|---|---|---|---|---|---|---|---|
| Time Liquid | Initial | 5 sec | 10 sec | 30 sec | 1 min | 1 hr | 5 hrs | 24 hrs | 5 days |
| MEK | .152 | .700 | .850 | .950 | 1.0 | 1.0 | 1.0 | 1.0 | 1.0 |
| Gasoline | .150 | .650 | .800 | 1.0 | 1.1 | 1.1 | 1.1 | 1.1 | 1.1 |
| Kerosene | .160 | .600 | .800 | 1.1 | 1.3 | 1.3 | 1.3 | 1.3 | 1.3 |
| Water | .210 | .210 | .210 | .210 | .210 | .255 | .320 | .420 | .590 |

EXAMPLE 2

The leak detecting device of Example 1 was produced with the exception that the amount of graphite introduced was 50 weight %, and the shape PTFE article was expanded and not sintered. The electrical resistance of this device in Ω was measured and is tabulated below.

| Time Liquid | Initial | 5 sec | 10 sec | 30 sec | 1 min | 1 hr | 5 hrs | 24 hrs | 5 days |
|---|---|---|---|---|---|---|---|---|---|
| MEK | 6.0 | 65 | 70 | 70 | 70 | 70 | 70 | 70 | 70 |

-continued

| Time Liquid | Initial | 5 sec | 10 sec | 30 sec | 1 min | 1 hr | 5 hrs | 24 hrs | 5 days |
|---|---|---|---|---|---|---|---|---|---|
| Gasoline | 7.5 | 75 | 85 | 90 | 90 | 90 | 90 | 90 | 90 |
| Kerosene | 5.5 | 45 | 55 | 60 | 60 | 60 | 60 | 60 | 60 |
| Water | 6.0 | 6.0 | 6.0 | 6.0 | 6.0 | 6.5 | 6.5 | 7.5 | 9.0 |

EXAMPLE 3

A lubricated PTFE mixture containing 15 weight % of graphite was ram extruded and rolled into a 0.1 mm thick sheet having electro-conductivity and continuous pores. The sheet was placed in a constant temperature chamber set at 300° C. for 30 seconds, then stretched in the lengthwise direction to 1.5 times the original length, and slit into a tape 4 mm wide. A copper conductor, 1.5 mm O.D., was wrapped with the stretched PTFE tape to an O.D. of 3 mm and then over braided with thin copper wires each 0.1 mm in O.D. This coaxial cable assembly was then cut to a length of 30 mm and connected with lead wires as shown in FIG. 1 to a resistance sensor. In one type of the device, the PTFE layer was left unsintered, and in the other type of the device the PTFE layer was partially sintered by placing it in a constant temperature chamber held at 350° C. for one minute. These devices were immersed in MEK, gasoline, kerosene, heavy oil C and water, and the change in the resistance was measured. The results in kΩ are shown in the following table. The liquid and device temperatures were 20° C. and the relative humidity of the ambient air was 56%. The devices used for the experiment were reusable after the impregnated liquids were evaporated.

| | Resistance Change in the Device using Unsintered PTFE | | | | | | | | |
|---|---|---|---|---|---|---|---|---|---|
| Time Liquid | Initial | 5 sec | 10 sec | 30 sec | 1 min | 1 hr | 5 hrs | 24 hrs | 5 days |
| MEK | 1.02 | 65.0 | 66.0 | 66.0 | 66.0 | 66.0 | 66.0 | 66.0 | 66.0 |
| Gasoline | 1.00 | 13.0 | 18.0 | 20.0 | 20.0 | 20.0 | 20.0 | 20.0 | 20.0 |
| Kerosene | 1.28 | 4.5 | 8.0 | 11.2 | 12.0 | 12.0 | 12.0 | 12.0 | 12.0 |
| Heavy Oil C | .540 | .540 | .540 | .545 | .550 | .580 | .600 | 1.1 | 4.0 |
| Water | .950 | .950 | .950 | .950 | .950 | 1.05 | 1.07 | 1.10 | 1.15 |

| | Resistance Change in the Device using Partially Sintered PTFE | | | | | | | | |
|---|---|---|---|---|---|---|---|---|---|
| Time Liquid | Initial | 5 sec | 10 sec | 30 sec | 1 min | 1 hr | 5 hrs | 24 hrs | 5 days |
| MEK | .520 | 3.0 | 3.3 | 3.4 | 3.4 | 3.4 | 3.4 | 3.4 | 3.4 |
| Gasoline | .400 | 2.7 | 2.9 | 3.0 | 3.0 | 3.0 | 3.0 | 3.0 | 3.0 |
| Kerosene | .328 | .900 | 1.5 | 2.7 | 2.7 | 2.7 | 2.7 | 2.7 | 2.7 |
| Water | .360 | .360 | .360 | .360 | .360 | .410 | .440 | .490 | .590 |

EXAMPLE 4

Using 12 copper conductors (0.254 mm O.D. and 1.12 mm spacing between conductors) and 2 electro-conductive PTFE sheets (0.1 mm thickness) containing 15 weight % of graphite, a leak detecting device in the form of a flat cable was prepared as shown in FIG. 2. The cable was cut to a length of 30 mm and the conductors were exposed at one end and assembled one after the other into two electrodes.

The resultant device was exposed to various liquids and vapors from the liquids as shown in the following table, and the resistance change of the device was measured. The results in Ω are summarized in the table below. The liquid and ambient temperature was 25° C. and the relative humidity was 71%. The vapors to be detected from the liquids were held at their saturated vapor pressure. The devices were restored to their initial states after the absorbed vapors were evaporated.

| Liquid & Vapors | Time | | | | | | | | |
|---|---|---|---|---|---|---|---|---|---|
| | Initial | 5 sec | 10 sec | 30 sec | 1 min | 1 hr | 5 hrs | 24 hrs | 5 days |
| MEK | 55 | 210 | 220 | 220 | 220 | 220 | 220 | 220 | 220 |
| Gasoline | 30 | 180 | 190 | 195 | 195 | 195 | 195 | 195 | 195 |
| Kerosene | 44 | 193 | 210 | 230 | 240 | 240 | 240 | 240 | 240 |
| Heavy Oil C | 42 | 42 | 42 | 42 | 42 | 90 | 150 | 400 | 600 |
| Water | 41 | 41 | 41 | 41 | 41 | 36 | 36 | 38 | 38 |
| MEK Vapor | 42 | 80 | 80 | 80 | 80 | 80 | — | — | — |
| Gasoline Vapor | 42 | 78 | 78 | 78 | 78 | 78 | — | — | — |
| Kerosene Vapor | 42 | 43 | 43 | 43 | 43 | 43 | — | — | — |

EXAMPLE 5

Two copper conductors (each 0.29 mm in O.D.), held in parallel with a 25 mm spacing, were sandwiched between two electro-conductive, unsintered PTFE sheets (0.1 mm thick) containing 15 weight % graphite, and this assembly was sandwiched between two unsintered, extruded, unfilled PTFE sheets (0.3 mm thick) produced by extrusion and rolling. These members were pressed together by a pair of compression rolls, thus obtaining a liquid detecting device in a flat shape. Each conductor of the device was heated by applying a 10 A electric current for one minute, and the conductive PTFE and unsintered PTFE sheets in the region around the conductors were sintered, thus increasing the mechanical contacts between the conductor and the conductive PTFE and PTFE sheets.

The device was then cut to a length of 40 mm, and an end of each conductor was pulled out by 10 mm to which an insulated lead wire was connected. Both end sections of the device were sealed by epoxy molding in order to prevent water from penetrating into the device from the end sections. The resultant device was used for the experiment to detect an oil film resulting from an oil leak on the surface of water.

The testing procedure was as follows: The device was held vertically at a position in a water trough where the water surface was at the center of the device, i.e., the upper half of the section was out of water and the lower half was submerged in water. Onto the surface of the water was spread various liquids to be detected to a thickness 0.5 mm or less. Existence of the liquids was detected as a resistance change of the device which was caused by the absorption of the liquids into the conductive PTFE. The water and liquid temperatures were 25° C., and the relative humidity of the ambient air was 56%.

| Time Liquid | The Resistance Change (ink Ω) between Conductors in the Device | | | | | | | | |
|---|---|---|---|---|---|---|---|---|---|
| | Initial | 3 sec | 10 sec | 30 sec | 1 min | 5 min | 10 min | 20 min | 1 hr |
| Gasoline | 5.3 | 13.3 | 41.1 | 41.1 | 41.1 | 41.1 | 41.1 | 41.1 | 41.1 |
| Kerosene | 5.1 | 5.1 | 24.5 | 37.0 | 39.5 | 39.5 | 39.5 | 39.5 | 39.5 |
| Heavy Oil A | 4.8 | 4.8 | 5.5 | 8.4 | 30.0 | 37.2 | 37.2 | 37.2 | 37.2 |
| Crude Oil (Arabia) | 5.1 | 5.1 | 5.1 | 5.1 | 5.6 | 12.8 | 20.9 | 31.9 | 37.7 |
| Heavy Oil B | 5.0 | 5.0 | 5.0 | 5.0 | 5.0 | 5.3 | 10.0 | 20.0 | 34.5 |
| Heavy Oil C | 5.3 | 5.3 | 5.3 | 5.3 | 5.3 | 5.3 | 5.3 | 5.6 | 6.1 |

I claim:
1. A liquid leak detecting device for detecting leaks from holding means for said liquid, said device being connected electrically to a resistance measuring sensor and display means, said device comprising at least two electrical conductors held in substantially parallel relationship and separated from each other by a continually porous polytetrafluoroethylene material having a powdered electro-conductive substance impregnated within the pores of said porous material.

2. The device of claim 1 wherein said electroconductive substance is carbon powder.

3. The device of claim 1 wherein said electroconductive substance is selected from the group consisting of carbon black, graphite and fibrous carbon.

4. The device of claim 1 wherein said electroconductive substance is a cermet.

5. The device of claim 1 wherein said electroconductive substance is selected from the group consisting of nitrides, borides, silicides and metal oxides.

6. The device of claim 1 in which the porous polytetrafluoroethylene is unsintered.

7. The device of claim 1 in which the porous polytetrafluoroethylene is partially sintered.

* * * * *